(12) United States Patent
Hsu

(10) Patent No.: US 9,426,945 B2
(45) Date of Patent: Aug. 30, 2016

(54) PRUNING SHEARS

(71) Applicant: FORMOSA TOOLS CO., LTD., Changhua (TW)

(72) Inventor: Wei-Chun Hsu, Changhua (TW)

(73) Assignee: FORMOSA TOOLS CO., LTD., Changhua (TW)

( * ) Notice: Subject to any disclaimer, the term of this patent is extended or adjusted under 35 U.S.C. 154(b) by 4 days.

(21) Appl. No.: 14/520,360

(22) Filed: Oct. 22, 2014

(65) Prior Publication Data

US 2016/0113208 A1    Apr. 28, 2016

(51) Int. Cl.
*A01G 3/047* (2006.01)
*B26B 13/00* (2006.01)
*A01G 3/02* (2006.01)
*B26B 13/26* (2006.01)

(52) U.S. Cl.
CPC .............. *A01G 3/021* (2013.01); *B26B 13/26* (2013.01)

(58) Field of Classification Search
CPC ........ A01G 3/021; B26B 13/26; B26B 13/28
See application file for complete search history.

(56) References Cited

U.S. PATENT DOCUMENTS

| | | | | |
|---|---|---|---|---|
| 640,257 A * | 1/1900 | Baer | ..................... | A01G 3/025 30/192 |
| 1,897,532 A * | 2/1933 | Pilcher | ..................... | A61D 1/06 30/192 |
| 6,345,446 B1 * | 2/2002 | Huang | ................. | A01G 3/0251 30/192 |
| 6,658,967 B2 * | 12/2003 | Rutkowski | ............... | A01G 3/02 30/251 |
| 6,829,829 B1 * | 12/2004 | Huang | ................. | A01G 3/0475 30/193 |
| 8,225,513 B2 * | 7/2012 | Huang | ..................... | A01G 3/02 30/190 |
| 8,661,691 B2 * | 3/2014 | Huang | ................. | A01G 3/0251 30/245 |
| 2010/0269357 A1 * | 10/2010 | Shan | .................... | A01G 3/0251 30/254 |
| 2012/0311872 A1 * | 12/2012 | Wang | .................. | A01G 3/0251 30/252 |
| 2015/0135914 A1 * | 5/2015 | Cunningham | ....... | A01G 3/0251 83/13 |

FOREIGN PATENT DOCUMENTS

| | | | |
|---|---|---|---|
| DE | 297 21 377 U1 | * | 4/1998 |
| EP | 0 824 999 A2 | * | 9/1998 |
| FR | 2 532 235 | * | 3/1984 |
| WO | WO 2006/066728 A1 | * | 6/2006 |

* cited by examiner

*Primary Examiner* — Hwei C Payer
(74) *Attorney, Agent, or Firm* — Raymond Y. Chan; David and Raymond Patent Firm

(57) ABSTRACT

A pruning shears is revealed. The pruning shears include a first brake arm, a second brake arm, a blade, and at least one connection piece. The first brake arm is disposed with a first toothed part while the second brake arm is arranged with a second toothed part. The first toothed part and the second toothed part are engaged with each other. The connection piece is pivotally connected to the blade, the first brake arm, and the second brake arm. During a cutting process (pruning process), a force applied is reduced due to the connection piece pivotally connected to the first brake arm and the second brake arm. While the first and the second toothed parts are engaged with each other, the connection piece becomes a wall of the first and the second toothed parts for stabilizing the engagement of the first and the second toothed parts.

1 Claim, 5 Drawing Sheets

PRUNING SHEARS

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to pruning shears used in gardening, especially to pruning shears for trimming hard branches of trees, plants and fences. A stronger cutting force is required for pruning these plants so that the present invention provides a cutting structure with features of labor-saving and stability.

2. Description of Related Arts

Refer to EP1827770, a pair of clippers, especially hedge clippers, is revealed. Disclosed are manually operated clippers, especially hedge clippers, comprising a toothed gear (ZG, ZS) that is located between a first handle arm (GA1) and a first clipper arm (S1). The second handle arm (GA2) is hingedly connected to the second clipper arm (S2) while a coupling lever (HE) is provided between the second handle arm (S2) and the first handle arm (GA1) and/or the first clipper arm (S1) such that the handle arms and the blades can be swiveled in a largely symmetrical manner when the clippers are opened and closed even though the coupling structure encompassing only one toothed gear (ZG, ZS) is asymmetrical. In addition, the entire amount of force that is transmitted between the actuated handle arms and the blades can be influenced via the coupling lever. The patent is related to a pair of manually operated clippers and the force transmitted between a brake handle arm and a blade can be reduced through a connecting rod.

However, there is only one side of the engagement part between the toothed gears (ZG, ZS) being closed while the other side is opened, without any wall or covering. An upper end of the first dipper arm S1 becomes a wall for closing one side of the engagement part between the toothed gears (ZG, ZS). During the trimming of hard branches of plants, the blades may be unable to fit each other closely and the cutting is not smooth. A reaction force split the blades is also transmitted to the toothed gears (ZG, ZS) therebetween. Thus the toothed gears (ZG, ZS) are against and separated from each other due to the reaction force. Therefore the toothed gears (ZG, ZS) are unable to engage with each other normally. In another condition, the hard branches of the plants may be inserted into the toothed gears (ZG, ZS) through the open side. This also results in that the toothed gears (ZG, ZS) are unable to mesh smoothly.

SUMMARY OF THE PRESENT INVENTION

Therefore it is a primary object of the present invention to provide a pruning shears that is more labor-saving and stable during cutting process. The pruning shears combine a gear transmission device with double connecting rods. A first brake arm and a second brake arm of the pruning shears are acted and moved stably by engagement of a first toothed part with a second toothed part. Moreover, a connection piece and a first cover portion are used to support the first brake arm and the second brake arm for increasing force transmitted. The structure allows the operation of the pruning shears and the cutting process more labor-saving and stable.

In order to achieve the above object, a pruning shears of the present invention includes a first brake arm, a second brake arm, a blade, a connection piece, a first cover potion and a second cover potion. The first brake arm is disposed with a first toothed part and a first handle part while the second brake arm is arranged with a second toothed part and a second handle part. The first toothed part and the second toothed part are engaged with each other. Two ends of the connection piece are pivotally connected to the blade, the first cover portion and the second brake arm respectively. One end of the first cover portion is pivotally connected to the first brake arm while the other end thereof is pivotally connected to the second brake arm. One end of the second cover portion is pivotally connected to the first brake arm while the other end thereof is pivotally connected to the second brake arm. One end of the connection piece is indirectly and pivotally connected to the second brake arm by the first cover portion while the other end thereof is directly and pivotally connected to the blade. The connection piece and the first cover portion are pivotally connected to the second brake arm to form a linkage structure for pushing the blade to cut and reducing force required for cutting. Moreover, the first cover portion and the second over portion work as walls covering the first toothed part and the second toothed part during engagement so as to stabilize the engagement of the first toothed part with the second toothed part.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
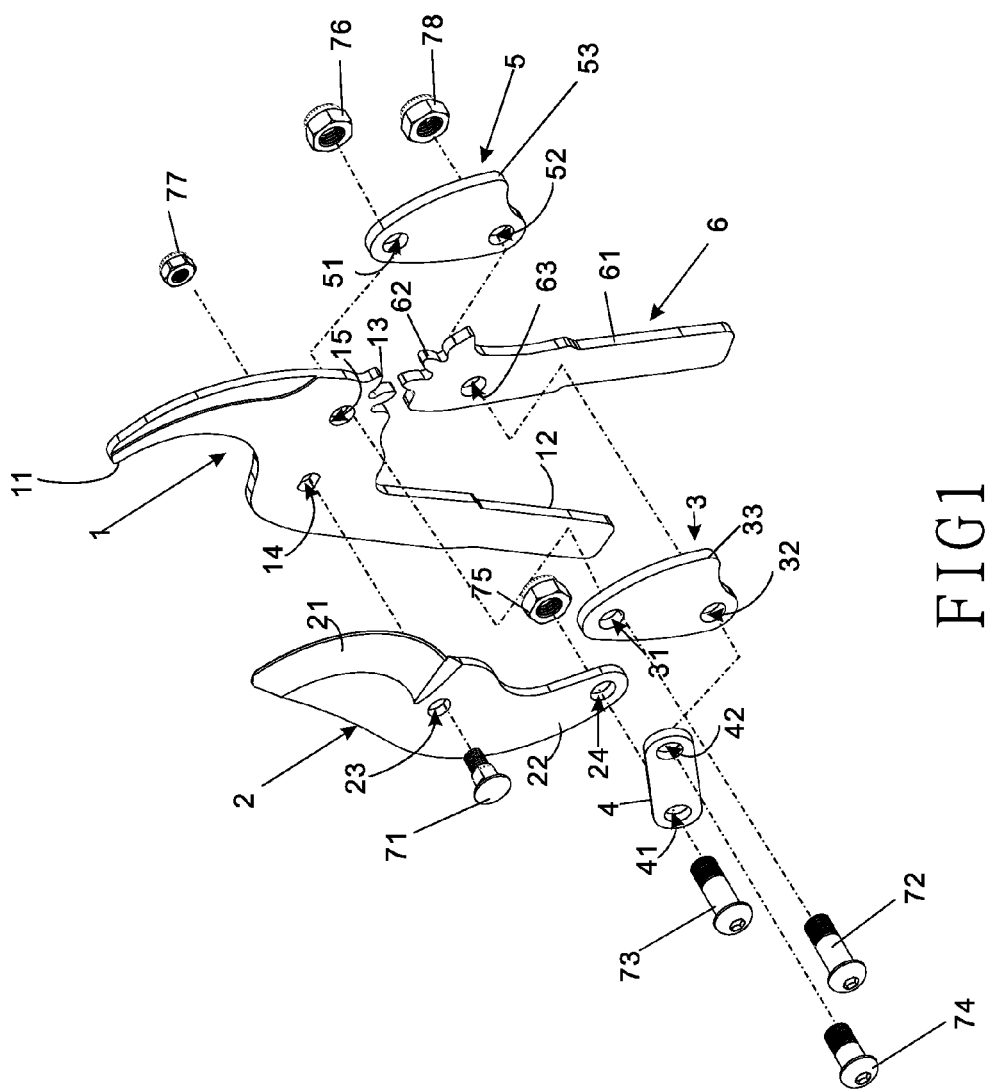
FIG. 1 is an explosive view of an embodiment according to the present invention.
Figure 2:
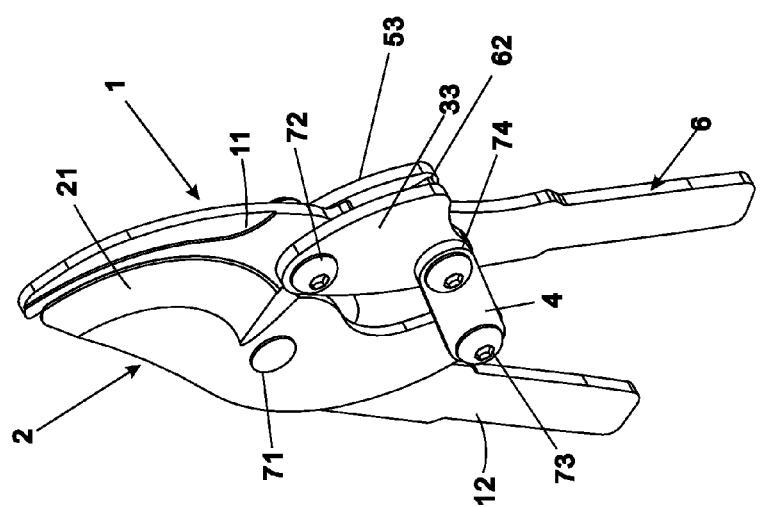
FIG. 2 is a perspective view of an embodiment according to the present invention.
Figure 3:
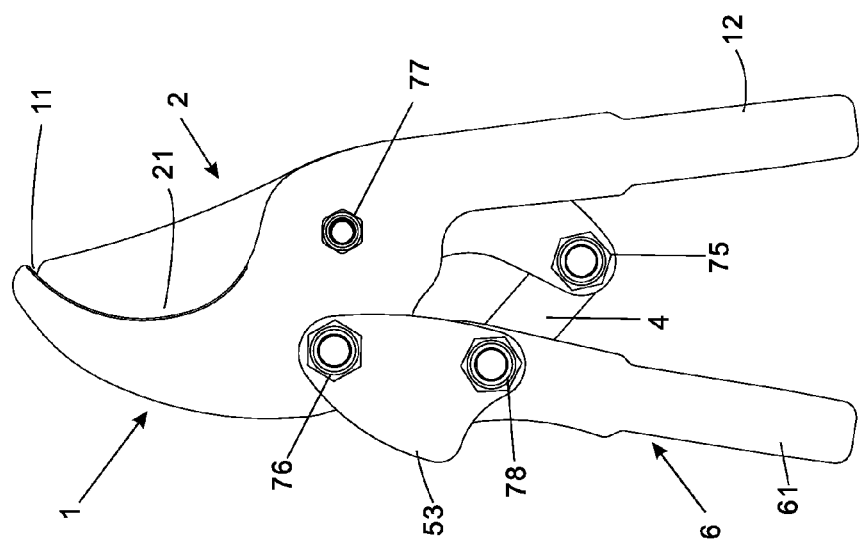
FIG. 3 is a rear view of an embodiment according to the present invention.

Refer to FIG. 1, a pruning shears of the present invention includes a first brake arm 1, a second brake arm 6, a blade 2, a connection piece 4, a first cover portion 3, and a second cover portion 5. The first brake arm 1 consists of a first toothed part 13, a first handle part 12 and a blunt part 11. A first axial part 14 and a second axial part 15 are disposed under the blunt part 11 while the first toothed part 13 is arranged between the blunt part 11 and the first handle part 12. The second brake arm 6 is composed of a second handle part 61, a second toothed part 62, and an assembly part 63 located between the second handle part 61 and the second toothed part 62. The first toothed part 13 and the second toothed part 62 are engaged with each other. The blade 2 includes a blade part 21, a third handle part 22, a first assembly part 23 and a second assembly part 24. Both the first assembly part 23 and the second assembly part 24 are disposed on the third handle part 22. The connection piece 4 is arranged with a first pivot part 41 and a second pivot part 42. The first cover portion 3 includes a projecting part 33, a third pivot part 31 and a fourth pivot part 32 while the second cover portion 5 consists of a curved convex part 53, a fifth pivot part 51 and a sixth pivot part 52. The first pivot part 41 of the connection piece 4 is pivotally connected to the second assembly pat 24 of the blade 2 by a bolt 73 threaded into a nut 75 and the second pivot part 42 of the connection piece 4 is pivotally connected to the fourth pivot part 32 of the first cover portion 3 by a bolt 74. The bolt 74 is further passed through the assembly part 63 of the second brake arm 6 and the sixth pivot part 52 of the second cover portion 5 to be screwed into a nut 78. A bolt 72 is inserted through the third pivot part 31 of the first cover portion 3, the second axial part 15 of the first brake arm 1 and the fifth pivot part 51 of the second cover portion 5 to be turned into a nut 76. The first assembly pat 23 of the blade 2 is pivotally connected to the first axial part 14 of the first brake arm 1 by a bolt 71 screwed into a nut 77.

Figure 4:
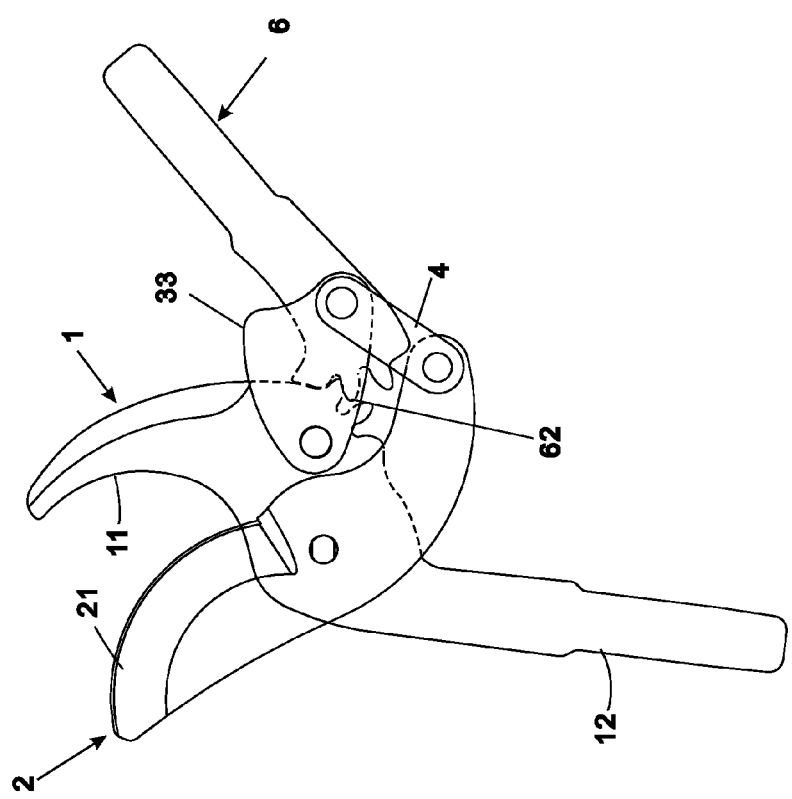
FIG. 4 is a schematic drawing showing an embodiment being opened according to the present I invention.
Figure 5:
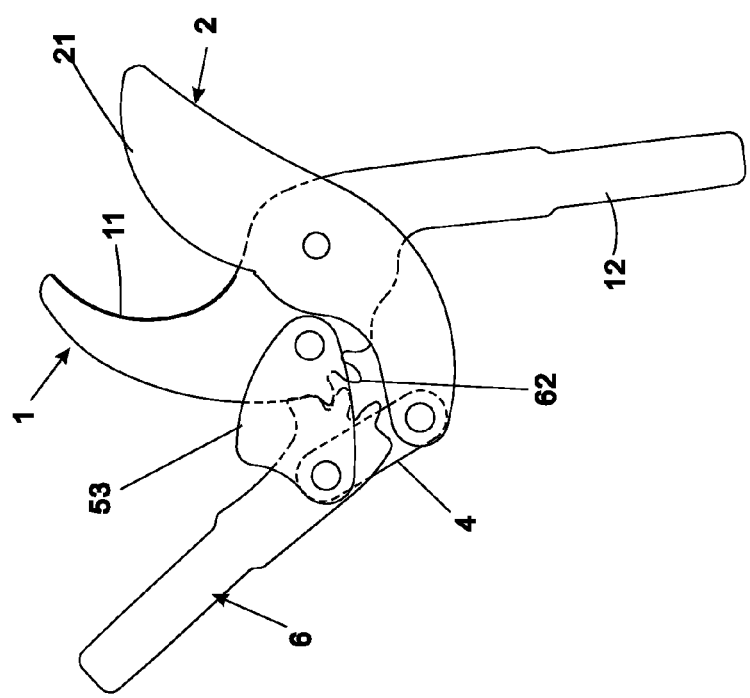
FIG. 5 is another schematic drawing showing an embodiment being opened according to the present I invention.

As shown in FIG. 4 and FIG. 5, the first cover portion 3 and the second cover portion 5 are worked like walls to clip the engagement part where the first toothed part 13 and the second toothed part 62 are engaged with each other. The projecting part 33 of the first cover portion 3 becomes a front wall covering the engagement part while the curved convex part 53 of the second cover portion 5 is a rear wall on the opposite side. When the first toothed part 13 and the second toothed part 62 are engaged with other, the projecting part 33 of the first cover portion 3 and the curved convex part 53 of the second cover portion 5 are also moved along with and covering the engagement part so as to stabilize the engagement of the first toothed part 13 with the second toothed part 62 and keep the engagement running smoothly. It should be noted that the first cover portion 3 and the second cover portion 5 can be moved like a pendulum. While the first toothed part 13 and the second toothed part 62 are moved for engagement, the first cover portion 3 and the second cover portion 5 are also moved along with the engagement part and covering the engagement part. Thus the projecting part 33 of the first cover portion 3 and the curved convex part 53 of the second cover portion 5 clip the engagement part between the first toothed part 13 and the second toothed part 62 to stabilize the engagement and movement between the first toothed part 13 and the second toothed part 62. Moreover, the connection piece 4 is indirectly and pivotally connected to the second brake arm 6 by the first cover portion 3. Thus the force applied can be reduced during a cutting process. The first cover portion 3 and the second cover portion 5 provide the function of stabilizing the engagement between the first toothed part 13 and the second toothed part 62, and move like two links. When the blade 2 pivotally connected to the connection piece 4 is used for cutting, the first cover portion 3 supports the first brake arm 1 and the second brake arm 6 to increase the force transmitted. The structure of the assembly allows the cutting process more labor saving and stable and this is one of the structural features of the present invention.

Furthermore, the pruning shears of the present invention is designed based on linkage. The first cover portion 3 and the second cover portion 5 are used to connect two shafts. The third pivot part 31 of the first cover portion 3 and the fifth pivot part 51 of the second cover portion 5 are worked as pivot points respectively. While the first cover portion 3 and the second cover portion 5 start to move like the pendulum due to the second handle part 61 of the second brake arm 6, the braking points thereof are under the pivot points. The braking points include the fourth pivot part 32 and the sixth pivot part 52. At the same time, the second pivot part 42 of the connection piece 4 pivotally connected to the braking points is also pushed and the pushing force is transmitted to the second assembly part 24 of the blade 2 by the first pivot part 41 of the connection piece 4. Thus the third handle part 22 of the blade 2 is pushed to move so that the blade part 21 of the blade 2 is moved and worked together with the blunt part 11 to perform the trimming process. Therefore the first cover portion 3 and the second cover portion 5 provide the function of links and stabilize the engagement part where the first toothed part 13 and the second toothed part 62 are engaged with each other.

The first assembly part 23 of the blade 2 is worked as a fulcrum while the third handle 22 is lever arm and the second assembly part 24 is a broken point. As to the first cover portion 3, the third pivot part 31 of the first cover portion 3 is a fulcrum and the fourth pivot part 32 is connected to the second brake arm 6 so as to make the first cover portion 3 become a lever arm for driving the connection piece 4 to move back-and-forth. The connection piece 4 further drives the blade 2 to move back-and-forth in relative to the blunt part 11 for carrying out the cutting process. The third handle part 22 together with the first cover portion 3 (the second portion 5) forms a double rocker mechanism while the connection piece 4 is used to link the third handle part 22 with the first cover portion 3. Moreover, the first cover portion 3 and the second cover portion 5 are lever arms moving synchronously. Thus the effort required for the second brake arm 6 to move in a pendulum manner is reduced. This is the second structural feature of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pair of pruning shears, comprising:
    a first brake arm having a first toothed part, a first handle part, a blunt part, a first axial part, and a second axial part, wherein the first axial part and the second axial part are disposed under the blunt part while the first toothed part is arranged between the first handle part and the blunt part;
    a second brake arm having a second handle part, a second toothed part, and an assembly part being set between the second handle part and the second toothed part, wherein the first toothed part and the second toothed part are engaged with each other;
    a blade including a third handle part, a first assembly part and a second assembly part, wherein the first assembly part and the second assembly part are provided on the third handle part;
    a connection piece having a first pivot part and a second pivot part;
    a first cover portion having a projecting part, a third pivot part and a fourth pivot part; and
    a second cover portion having a curved convex part, a fifth pivot part and a sixth pivot part;
    wherein the first pivot part of the connection piece is pivotally connected to the second assembly part of the blade, and the second pivot part of the connection piece is pivotally connected to the fourth pivot part of the first cover portion by a bolt, wherein the bolt is further passed through the assembly part of the second brake arm and the sixth pivot part of the second cover portion to be screwed into a nut, wherein the third pivot part of the first cover portion is pivotally connected to the second axial part of the first brake arm by another bolt that is further passed through the fifth pivot part of the second portion to be turned into another nut, wherein the first assembly part of the blade is pivotally connected to the first axial part of the first brake arm, wherein the projecting part of the first cover portion and the curved convex part of the second cover portion clip an engagement part where the first toothed part and the second toothed part are engaged with each other therebetween, wherein the connection piece is indirectly and pivotally connected to the second brake arm by the first cover portion.

\* \* \* \* \*